(12) United States Patent
Hayman et al.

(10) Patent No.: US 10,190,482 B2
(45) Date of Patent: Jan. 29, 2019

(54) AIR INLET ASSEMBLY FOR AN INTERNAL COMBUSTION ENGINE

(71) Applicant: GM GLOBAL TECHNOLOGY OPERATIONS LLC, Detroit, MI (US)

(72) Inventors: Alan W. Hayman, Romeo, MI (US); Eric C. Douse, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 740 days.

(21) Appl. No.: 14/626,054

(22) Filed: Feb. 19, 2015

(65) Prior Publication Data
US 2016/0245153 A1    Aug. 25, 2016

(51) Int. Cl.
  F02M 15/00    (2006.01)
  F02B 29/04    (2006.01)
  F02M 35/10    (2006.01)

(52) U.S. Cl.
  CPC ... *F02B 29/0468* (2013.01); *F02M 35/10026* (2013.01); *F02M 35/10072* (2013.01); *Y02T 10/146* (2013.01)

(58) Field of Classification Search
  CPC combination set(s) only.
  See application file for complete search history.

(56) References Cited

U.S. PATENT DOCUMENTS

| 2002/0189256 | A1 |  | 12/2002 | Kalish |  |
| 2010/0077995 | A1* | 4/2010 | Buia | F02B 29/0468 123/542 |
| 2010/0300647 | A1* | 12/2010 | Steurer | F28D 21/0003 165/52 |
| 2011/0094219 | A1* | 4/2011 | Palm | F02B 29/0468 60/599 |
| 2014/0076289 | A1* | 3/2014 | Ruona | F02B 29/0425 123/542 |
| 2014/0083398 | A1* | 3/2014 | Marceno | F28F 17/005 123/568.12 |
| 2015/0047615 | A1* | 2/2015 | Rollins | F02M 25/0836 123/520 |
| 2016/0061100 | A1* | 3/2016 | Radmard | F02B 29/0468 60/599 |

FOREIGN PATENT DOCUMENTS

| CN | 203476489 U | 3/2014 |
| DE | 102011002552 A1 | 7/2012 |
| DE | 202013101602 U1 | 5/2013 |
| DE | 102012006826 A1 | 10/2013 |

* cited by examiner

*Primary Examiner* — Stephen K Cronin
*Assistant Examiner* — Ruben Picon-Feliciano
(74) *Attorney, Agent, or Firm* — Quinn IP Law

(57) ABSTRACT

An internal combustion engine includes a cylinder block that defines a cylinder and a cylinder head mounted to the cylinder block. The engine additionally includes a gas compressor configured to selectively pressurize air being received from the ambient for delivery to the cylinder. The engine also includes an intake valve that is operatively connected to the cylinder head and controls delivery of the selectively pressurized air to the cylinder for combustion therein. Furthermore, the engine includes an air inlet assembly arranged between the intake valve and the compressor. The air inlet assembly is configured to supply the pressurized air to the cylinder and includes at least one passage configured to collect a condensate from the pressurized air. A vehicle having such an engine is also disclosed.

12 Claims, 4 Drawing Sheets

AIR INLET ASSEMBLY FOR AN INTERNAL COMBUSTION ENGINE

TECHNICAL FIELD

The present disclosure relates to an air inlet assembly for an internal combustion engine.

BACKGROUND

Internal combustion engines (ICE's) are often called upon to generate considerable levels of power for prolonged periods of time on a dependable basis. Many such engines employ forced induction via a gas compressor, such as a turbocharger or a supercharger, to pressurize ambient airflow before the air enters an intake manifold of the ICE in order to boost the engine's power and efficiency.

Forced induction engines frequently employ charge-air coolers or heat exchanger to further enhance the engine's volumetric efficiency by increasing density of an intake air charge through nearly isobaric, i.e., constant pressure, cooling. Typically, such a charge-air cooler is situated between the compressor and the intake manifold in order to cool the pressurized air prior to its entry into the engine's combustion chambers.

SUMMARY

One embodiment of the disclosure is directed to an internal combustion engine. The internal combustion engine includes a cylinder block that defines a cylinder and a cylinder head mounted to the cylinder block. The engine additionally includes a gas compressor configured to selectively pressurize air being received from the ambient for delivery to the cylinder. The engine also includes an intake valve that is operatively connected to the cylinder head and controls delivery of the selectively pressurized air to the cylinder for combustion therein. Furthermore, the engine includes an air inlet assembly arranged between the intake valve and the compressor. The air inlet assembly is configured to supply the pressurized air to the cylinder and includes at least one passage, such as a drainage groove, configured to collect a condensate from the pressurized air.

The air inlet assembly may include a charge-air cooler configured to cool the pressurized air prior to delivery thereof to the cylinder. The charge-air cooler may include a hot-side plenum configured to receive the pressurized air aft of the compressor and a cold-side plenum configured to discharge the pressurized air. In such a case, the at least one passage of the air inlet assembly includes at least a first passage that is arranged at least partially in the cold-side plenum for directing the condensate to the intake valve.

The charge-air cooler may be configured as one of an air-to-air and an air-to-liquid intercooler.

The charge-air cooler may also include a heat exchanger section configured to cool the pressurized air aft of the compressor. The heat exchanger section may include a feature arranged to direct the condensate toward the first passage. Such a feature may be a floor of the heat exchanger section.

The feature may be arranged at an angle, i.e., be inclined, relative to a horizontal plane when the engine is mounted in a vehicle positioned on a level surface.

The angle of the feature may be equal to or greater than 5 degrees relative to the horizontal plane.

The air inlet assembly may include a hot-side duct connecting the hot-side plenum to the compressor for delivery of heated pressurized air therefrom. The air inlet assembly may also include a cold-side duct connecting the cold-side plenum to the cylinder to deliver the cooled pressurized air thereto. The first passage may extend into the cold-side duct. Furthermore, the at least one passage may include a second passage that is arranged in the hot-side plenum and in fluid communication with the first passage.

The charge-air cooler may include a heat exchanger section configured to cool the pressurized air aft of the compressor. In such a case, the heat exchanger section may include a feature positioned to direct the condensate toward the first passage. Additionally, the feature may fluidly connect the first passage to the second passage.

The engine may include a plurality of cylinders, the air inlet assembly may include an intake manifold configured to distribute the pressurized air among the plurality of cylinders, and the cold-side duct may be incorporated into the intake manifold.

The intake manifold may be fluidly connected to the charge-air cooler such that the first passage is aligned with the second passage.

The engine may include a plurality of intake valves. In such a case, the first passage may include a plurality of sipes, such that each of the plurality of sipes directs the condensate toward each of the plurality of intake valves.

Another embodiment of the present disclosure is directed to a vehicle having such an internal combustion engine.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
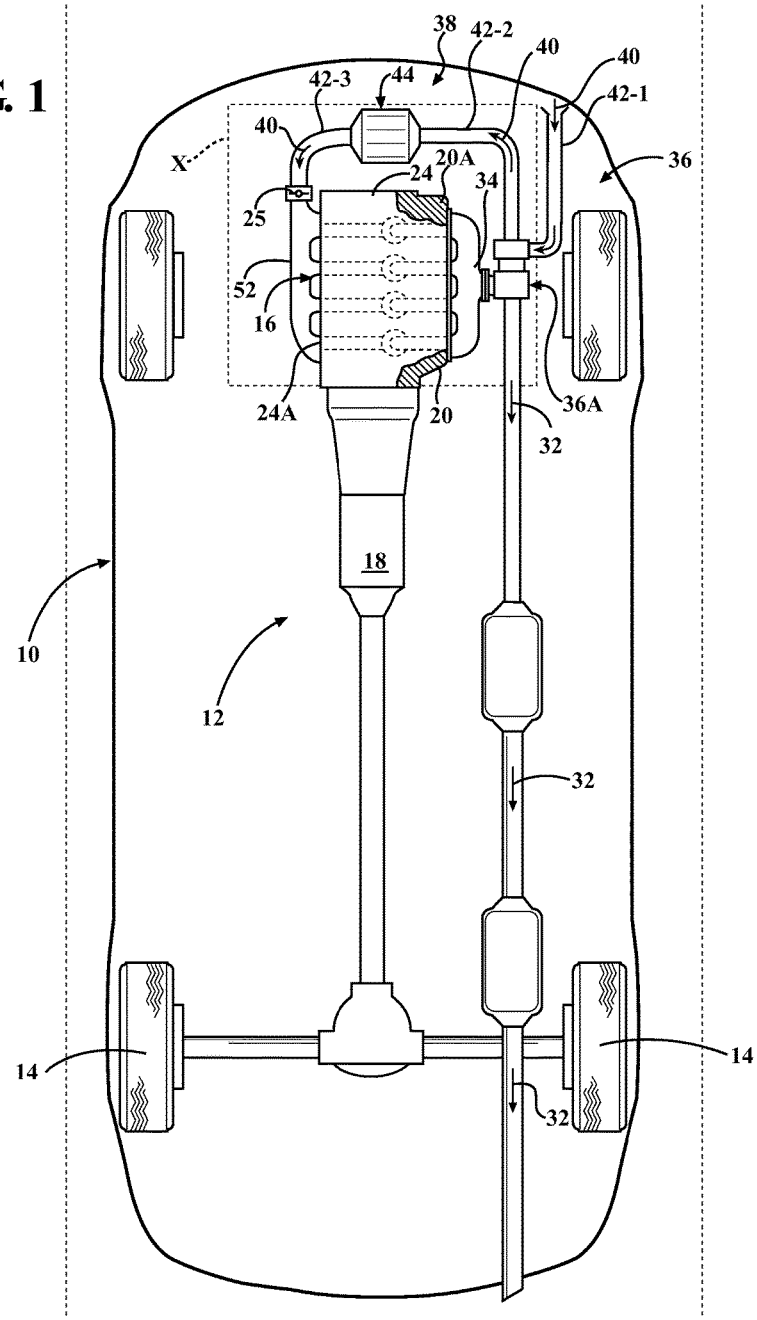
FIG. 1 is a schematic depiction of a vehicle having an engine with an induction system employing a gas compressor and a charge air cooler according to the disclosure.
Figure 2:
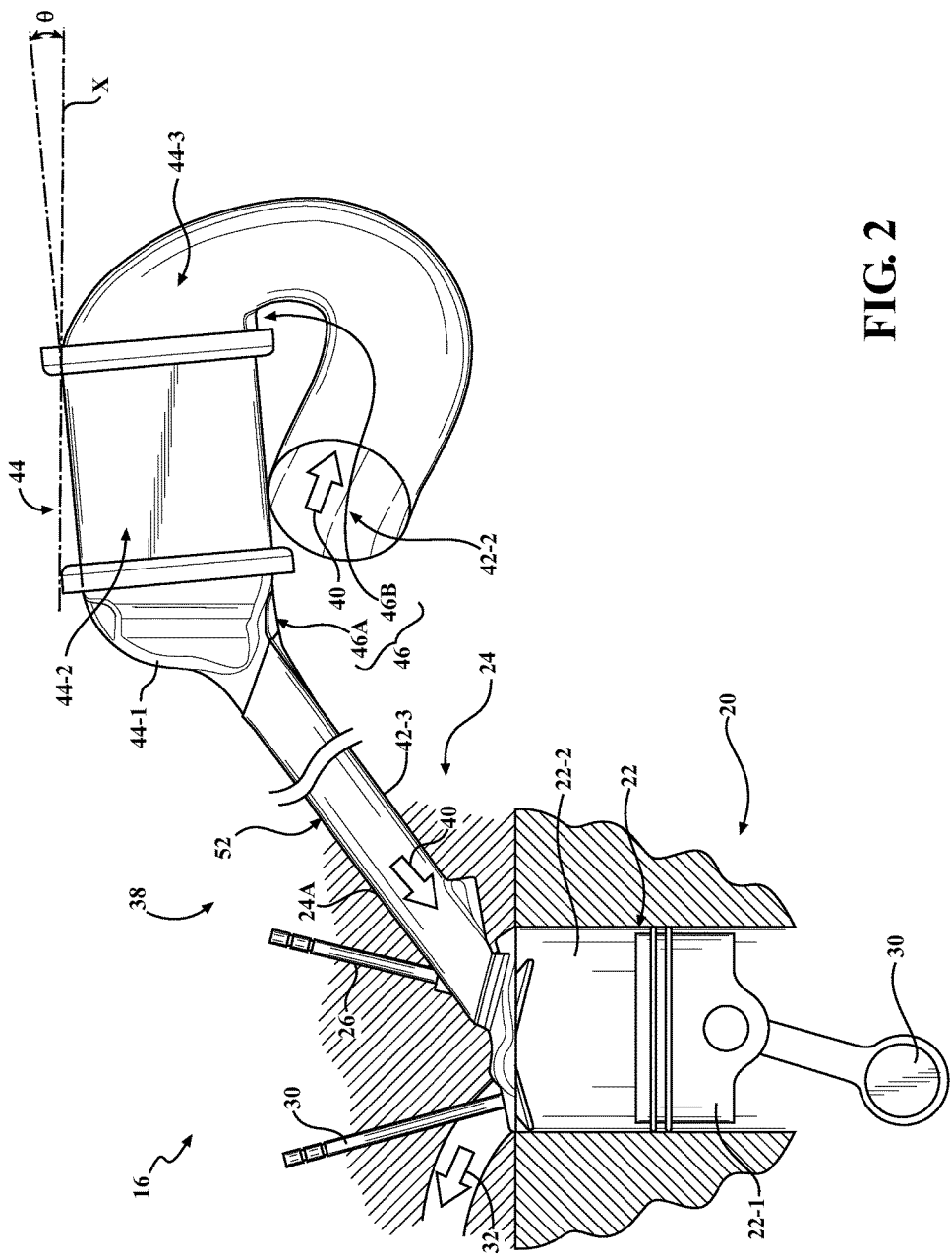
FIG. 2 is a schematic partial cross-sectional illustration of the engine shown in FIG. 1 having parts of a passage configured to collect a condensate from the pressurized air aft of the gas compressor.

Referring to the drawings, wherein like reference numbers correspond to like or similar components throughout the several figures, FIG. 1 illustrates a vehicle 10 employing a powertrain 12 for propulsion thereof via driven wheels 14. As shown, the powertrain 12 includes an internal combustion engine 16 and a transmission assembly 18 operatively connected thereto. The powertrain 12 may also include one or more electric motor/generators, none of which are shown, but the existence of which may be envisioned by those skilled in the art. As shown in FIG. 2, the engine 16 includes a cylinder block 20 with a plurality of cylinders 22 arranged therein. The cylinder block 20 defines a block deck 20A that may be arranged substantially in the horizontal plane X when the engine 16 is mounted in the vehicle 10 positioned on a level, i.e., horizontal, surface. Alternatively, the block deck 20A may be tilted, i.e., set at some angle, relative to the horizontal plane X when the engine 16 is mounted in the vehicle 10 positioned on a level surface. A cylinder head 24 may be mounted to the cylinder block 20 at the block deck 20A. As additionally shown in FIGS. 3-4, the cylinder head 24 may be integrated into or cast together with the cylinder block 20.

The cylinder head 24 receives air and fuel to be used inside the cylinders 22 for subsequent combustion. As can be seen in FIG. 2, each cylinder 22 includes a respective piston 22-1 configured to reciprocate therein. Additionally, combustion chambers 22-2 are formed within the cylinders 22 between the bottom surface of the cylinder head 24 and the tops of the pistons 22-1. As known by those skilled in the art, each of the combustion chambers 22-2 receives fuel and air that are combined to form a fuel-air mixture for subsequent combustion inside the subject combustion chamber. The engine 16 may include a throttle 25 (shown in FIG. 1), which can be configured as a traditional movable throttle blade or another type of an arrangement that meters a volume of air entering the engine from the ambient. Although an in-line four-cylinder engine is shown in FIGS. 1-4, nothing precludes the present disclosure from being applied to an engine having a different number and/or arrangement of cylinders 22.

As shown in FIG. 2, the engine 16 also includes a plurality of intake valves 26 operatively connected to the cylinder head 24 and configured to control a supply of air to each cylinder 22 for combustion with fuel therein. The cylinder head 24 generally includes inlet ports 24A for communicating the supply of air or air and fuel to the plurality of intake valves 26. The engine 10 may be configured as a spark-ignition internal combustion engine that employs a spark plug (not shown) to initiate combustion of the fuel and air mixture inside the combustion chambers 22-2. The engine 16 additionally includes a plurality of exhaust valves 30 operatively connected to the cylinder head 24 and configured to control removal of post-combustion gasses from each cylinder 22.

The engine 10 also includes a crankshaft (not shown) configured to rotate within the cylinder block 20. As known to those skilled in the art, the crankshaft is rotated by the pistons 22-1 as a result of an appropriately proportioned fuel-air mixture being selectively admitted into the combustion chambers 22-2 via one or more intake valves 26 and burned in the combustion chambers. After the air-fuel mixture is burned inside a specific combustion chamber 22-2, the reciprocating motion of a particular piston serves to exhaust post-combustion gasses 32 from the respective cylinder 22 via one or more exhaust valves 30. The cylinder head 24 is also configured to exhaust post-combustion gasses 32 from the combustion chambers 22-2, such as via an exhaust manifold 34. The exhaust manifold 34 may be internally cast, i.e., integrated, into the cylinder head 24, or be configured as a separate, attachable component for scavenging the exhaust post-combustion gasses 32 from the cylinders 22.

As shown in FIG. 1, the engine 10 also includes a boosting system 36 that is configured as a forced induction arrangement having at least one gas compressor 36A. A representative gas compressor 36A may be either a supercharger (not shown) mechanically driven by the crankshaft via a belt or electrically via a motor, or a turbocharger (as shown in FIG. 1) driven by the post-combustion gasses 32 emitted by the cylinders 22 via the exhaust valves 30. Additionally, the boosting system 36 may be configured as a multi-stage arrangement having multiple gas compressors. Such a multi-stage boosting system may, for example, include two gas compressors, wherein one compressor is configured as either a supercharger or a first turbocharger, and another gas compressor is configured as second turbocharger.

The engine 16 additionally includes an induction system or inlet assembly 38 that is configured to supply a flow of air or airflow 40 to the cylinders 22. The inlet assembly 38 includes a charge-air cooler 44. The charge-air cooler 44 is configured to cool the airflow 40 after the airflow is pressurized by the boosting system 36 and air prior to delivery of the pressurized airflow 40 to the cylinders 22. The charge-air cooler 44 may be configured as an air-to-air or an air-to-liquid intercooler, as understood by those skilled in the art. The charge-air cooler 44 includes a cold-side plenum 44-1 configured to discharge the cooled pressurized airflow aft of the heat exchanger section, a heat exchanger section 44-2 configured to cool the pressurized airflow 40 received at the hot-side plenum, and a hot-side plenum 44-3 configured to receive the pressurized airflow aft of the compressor 36A.

Figure 3:
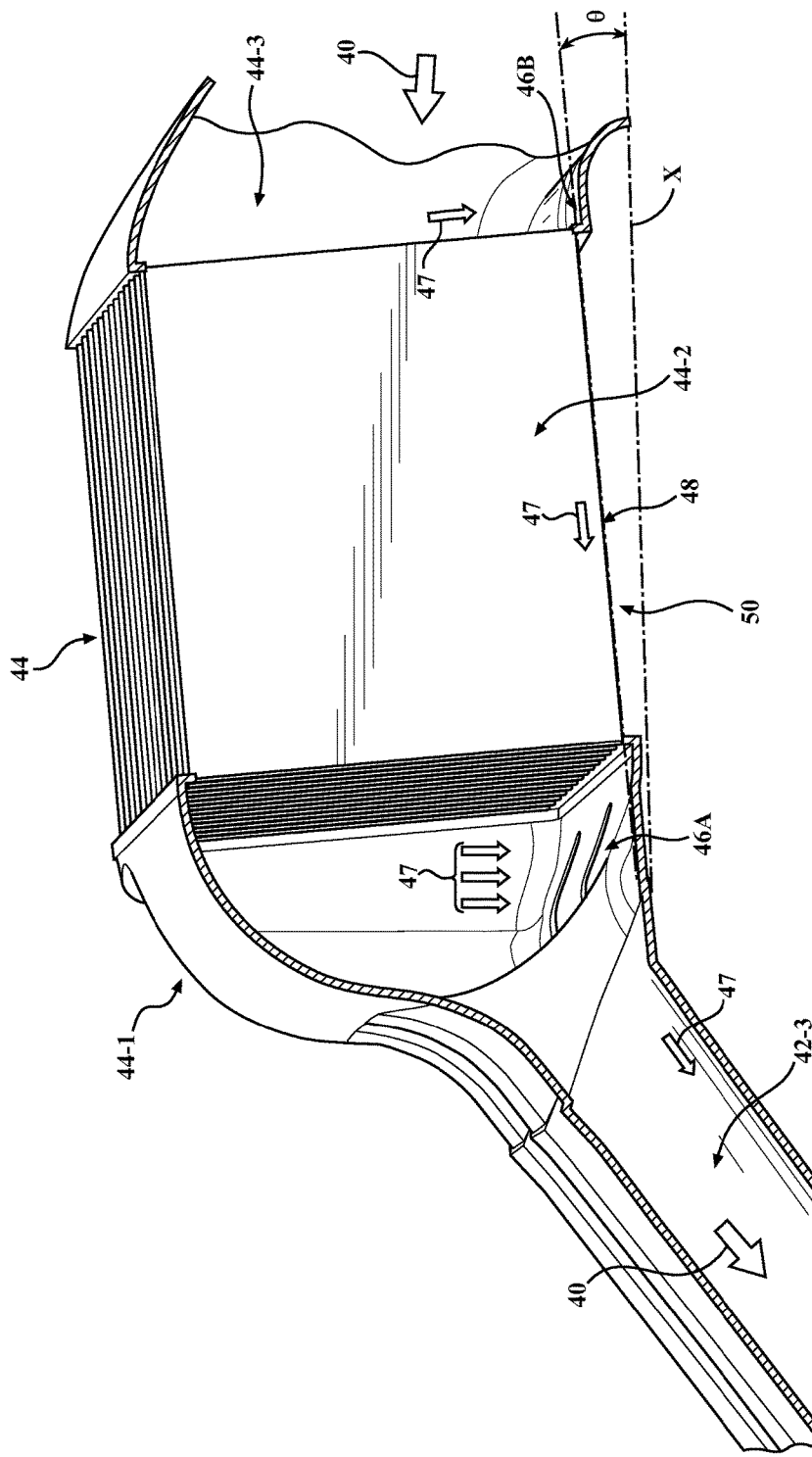
FIG. 3 is a schematic cross-sectional perspective illustration of a part of the induction system shown in FIG. 2.
Figure 4:
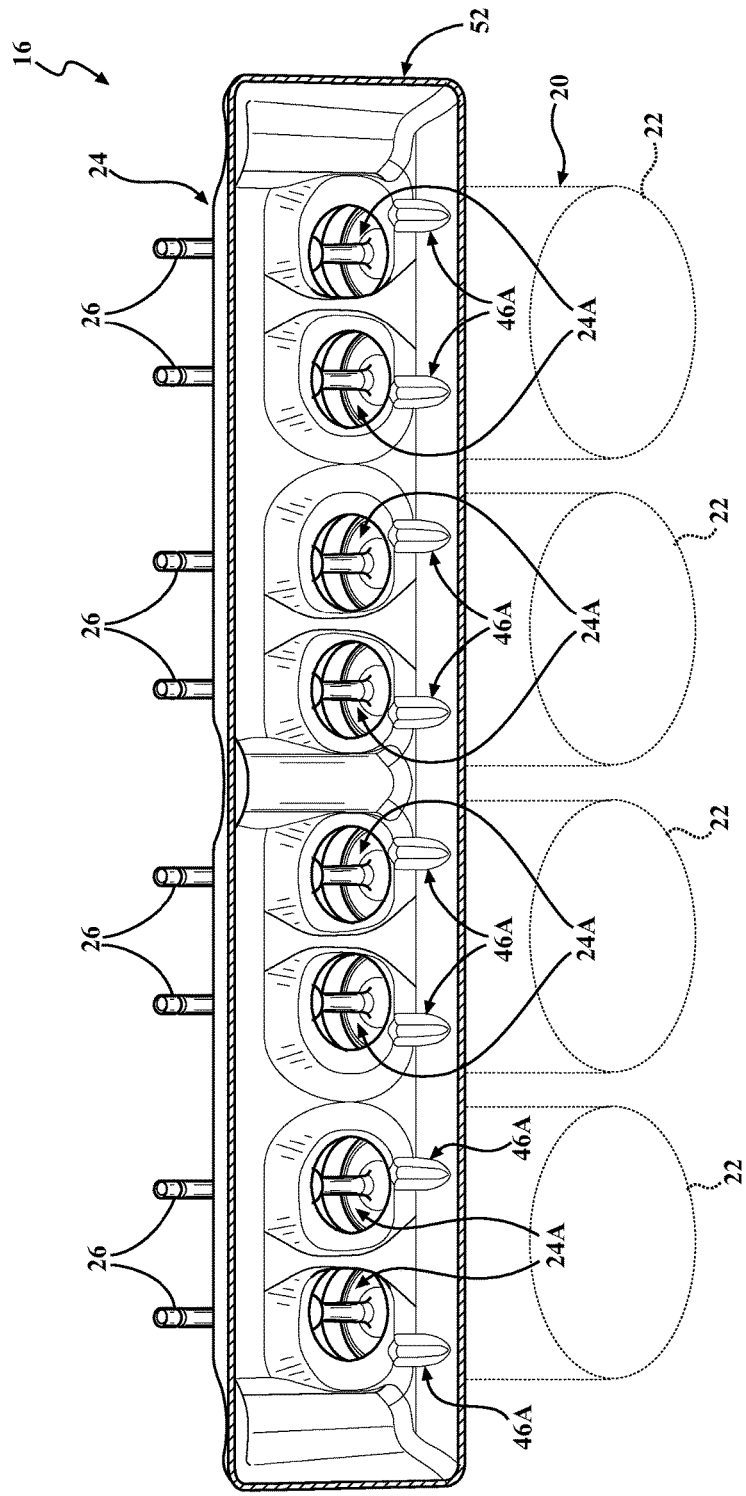
FIG. 4 is a schematic cross-sectional illustration of the engine shown in FIGS. 1 and 2, showing another part of the passage configured to collect the condensate.

As shown in FIGS. 2-3, the charge-air cooler 44 also includes at least one passage 46 for collecting a condensate 47 from the pressurized airflow 40 that may develop as a result of the airflow being cooled to its saturation limit within the charge-air cooler. Although a significant quantity of condensate 47 may be generated proximately to the cold-side plenum 44-1, the typical drop in temperature that takes place in the charge-air cooler 44 may also promote generation of condensate 47 proximately to the hot-side plenum 44B. Accordingly, the provided at least one passage 46 may include a first passage 46A that is arranged in the cold-side plenum 44-1 of the charge-air cooler 44 and a second passage 46B that is arranged in the hot-side plenum 44-3. Each of the first and second passages 46A, 46B may be configured as a sipe, such as a drainage groove or channel incorporated into the structure of the respective plenums 44-1, 44-3. The first and second passages 46A, 46B may each be configured with any appropriate shape and cross-section to ensure effective collection of the condensate 47 and flow thereof toward the inlet ports 24A. The first passage 46A may include a plurality of individual sipes, wherein each respective sipe directs the condensate 47 toward an individual intake valve 26, as shown in FIGS. 2 and 3.

The heat exchanger section 44-2 is defined by sidewalls, wherein one of the sidewalls is positioned as the vertically lowest wall or floor 48 when the charge-air cooler 44 is arranged in the vehicle 10. The heat exchanger section 44-2 may additionally include a feature 50 positioned to direct the condensate 47 collected from the airflow 40 by the second passage 46B toward first passage 46A and on toward the intake valves 26 via the inlet ports 24A. When the engine 16 is mounted in the vehicle 10, and the vehicle itself is positioned on a level surface, the feature 50 is intended to be arranged at an angle $\theta$, i.e., be inclined, relative to the horizontal plane X. Accordingly, the charge-air cooler 44 should be fixed relative to the engine 16 such that, when the engine 16 is mounted in the vehicle 10 positioned on a level surface, the feature 50 becomes arranged at the angle $\theta$ relative to the horizontal plane X.

The feature 50 may be the floor 48 or a specially configured, i.e., shaped and routed passageway situated proximate to the floor 48 and inclined at the angle $\theta$ relative to the horizontal plane X. The angle $\theta$ of the feature may be equal to or greater than 5 degrees relative to horizontal plane X. The feature 50 may be configured to fluidly connect the first passage 46A to the second passage 46B, as well as be fluidly exposed to the heat exchanger section 44-2. In such an embodiment, the feature 50 ensures that the condensate 47 collected from each of the hot-side plenum 44-1, the heat exchanger section 44-2, and the cold-side plenum 44-3 is routed away from the charge-air cooler 44 toward the inlet port 24A so that it may be consumed by the engine 16.

As shown in FIGS. 1 and 2, the induction system 38 includes an ambient-air duct 42-1 positioned upstream of the boosting system 36 and configured to deliver the airflow 40 from the ambient to the representative gas compressor 36A. The ambient-air duct 42-1 may include an air filter (not shown) to ensure that the opportunity for ambient debris to enter the boosting system 36 and the charge-air cooler 44 is minimized. The induction system 38 includes a hot-side duct 42-2 configured to channel the pressurized and heated airflow 40 from the boosting system 36 to the charge-air cooler 44. Additionally, the induction system 38 includes a cold-side duct 42-3 configured to channel the cooled pressurized airflow 40 from the charge-air cooler 44 to the intake valves 26 at each cylinder 22.

As shown in FIG. 3, the first passage 46A may extend into, as well as along the length of, the cold-side duct 42-3. The induction system 38 may also include an intake manifold 52 (shown in FIGS. 1 and 2) configured to distribute the pressurized and cooled airflow 40 among the plurality of cylinders 22. The cold-side duct 42-3 may be incorporated into the intake manifold 52. The intake manifold 52 may be fixed relative to the charge-air cooler 44 to establish a consistent stationary relationship therebetween. The intake manifold 52 may also be fluidly connected to the charge-air cooler 44 such that the first passage 46A is aligned with the second passage 46B to thereby generate a direct path for the condensate 47 therebetween and toward the inlet ports 24A and intake valves 26 within the cylinder head 24.

Overall, the passages 46A and 46B are arranged upstream of the intake valves 26 and may be aligned with each other to effectively direct the condensate 47 away from the charge-air cooler 44 and toward the intake valves 26. Such removal of the condensate 47 and subsequent consumption thereof during operation of the engine 16 is intended to minimize the possibility of the condensate freezing inside the inlet assembly 38.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An internal combustion engine comprising:
   a cylinder block defining a cylinder;
   a cylinder head mounted to the cylinder block;
   a gas compressor configured to selectively pressurize air being received from the ambient for delivery to the cylinder;
   an intake valve operatively connected to the cylinder head and configured to control delivery of the selectively pressurized air to the cylinder for combustion therein; and
   an air inlet assembly arranged between the intake valve and the gas compressor, configured to supply the pressurized air to the cylinder, and including at least one passage configured to collect a condensate from the pressurized air;
   wherein:
   the air inlet assembly includes a charge-air cooler configured to cool the pressurized air prior to delivery thereof to the cylinder;
   the charge-air cooler includes a heat exchanger section configured to cool the pressurized air aft of the gas compressor, a hot-side plenum configured to receive the pressurized air aft of the gas compressor, and a cold-side plenum configured to discharge the pressurized air from the heat exchanger section;
   the at least one passage of the air inlet assembly includes a first passage arranged at least partially in the cold-side plenum and configured to direct the condensate to the intake valve, and a second passage arranged at least partially in the hot-side plenum and in fluid communication with the first passage;
   the second passage includes at least one sine configured to collect the condensate; and
   the heat exchanger section includes a feature arranged to direct the condensate toward the first passage;
   wherein the feature is arranged at an angle relative to a horizontal plane when the engine is positioned on a level surface;
   wherein the angle of the feature is equal to or greater than 5 degrees relative to the horizontal plane.

2. The engine of claim 1, wherein the charge-air cooler is configured as one of an air-to-air and an air-to-liquid intercooler.

3. The engine of claim 1, wherein the feature of the heat exchanger section is a floor of the heat exchanger section.

4. The engine of claim 1, wherein:
   the cylinder includes a plurality of cylinders;
   the air inlet assembly includes an intake manifold configured to distribute the pressurized air among the plurality of cylinders;
   the cold-side duct is incorporated into the intake manifold; and
   the intake manifold is fluidly connected to the charge-air cooler such that the first passage is aligned with the second passage.

5. The engine of claim 1, wherein the first passage includes at least one sipe configured to collect the condensate.

6. The engine of claim 5, wherein the engine includes a plurality of intake valves and the at least one sipe in the first passage includes a plurality of sipes, such that each of the plurality of sipes directs the condensate toward each of the plurality of intake valves.

7. A vehicle comprising:
   a road wheel; and
   an internal combustion engine configured to generate torque for driving the road wheel, the engine having:
   a cylinder block defining a cylinder;
   a cylinder head mounted to the cylinder block;
   a gas compressor configured to selectively pressurize air being received from the ambient for delivery to the cylinder;

an intake valve operatively connected to the cylinder head and configured to control delivery of the selectively pressurized air to the cylinder for combustion therein; and an air inlet assembly arranged between the intake valve and the gas compressor, configured to supply the pressurized air to the cylinder, and including at least one passage configured to collect a condensate from the pressurized air;

wherein:

the air inlet assembly includes a charge-air cooler configured to cool the pressurized air prior to delivery thereof to the cylinder;

the charge-air cooler includes a heat exchanger section configured to cool the pressurized air aft of the gas compressor, a hot-side plenum configured to receive the pressurized air aft of the gas compressor, and a cold-side plenum configured to discharge the pressurized air from the heat exchanger section;

the at least one passage of the air inlet assembly includes a first passage arranged at least partially in the cold-side plenum and configured to direct the condensate to the intake valve, and a second passage arranged at least partially in the hot-side plenum and in fluid communication with the first passage;

the second passage includes at least one sipe configured to collect the condensate; and the heat exchanger section includes a feature arranged to direct the condensate toward the first passage;

wherein the feature is arranged at an angle relative to a horizontal plane when the vehicle is positioned on a level surface;

wherein the angle of the feature is equal to or greater than 5 degrees relative to the horizontal plane.

8. The vehicle of claim 7, wherein the charge-air cooler is configured as one of an air-to-air and an air-to-liquid intercooler.

9. The vehicle of claim 7, wherein the feature of the heat exchanger section is a floor of the heat exchanger section.

10. The vehicle of claim 7, wherein:

the cylinder includes a plurality of cylinders;

the air inlet assembly includes an intake manifold configured to distribute the pressurized air among the plurality of cylinders;

the cold-side duct is incorporated into the intake manifold; and the intake manifold is fluidly connected to the charge-air cooler such that the first passage is aligned with the second passage.

11. The vehicle of claim 7, wherein the first passage includes at least one sipe configured to collect the condensate.

12. The engine of claim 11, wherein the engine includes a plurality of intake valves and the at least one sipe in the first passage includes a plurality of sipes, such that each of the plurality of sipes directs the condensate toward each of the plurality of intake valves.

* * * * *